No. 862,219. PATENTED AUG. 6, 1907.
C. L. UPDEGRAFF.
PRESSURE RETAINING VALVE FOR AIR BRAKES.
APPLICATION FILED MAR. 27, 1907.

WITNESSES: Charles L. Updegraff, INVENTOR.
By C. A. Snow & Co.
ATTORNEYS

UNITED STATES PATENT OFFICE.

CHARLES L. UPDEGRAFF, OF WEST FAIRVIEW, PENNSYLVANIA.

PRESSURE-RETAINING VALVE FOR AIR-BRAKES.

No. 862,219.  Specification of Letters Patent.  Patented Aug. 6, 1907.

Application filed March 27, 1907. Serial No. 364,882.

*To all whom it may concern:*

Be it known that I, CHARLES L. UPDEGRAFF, a citizen of the United States, residing at West Fairview, in the county of Cumberland and State of Pennsylvania, have invented a new and useful Pressure-Retaining Valve for Air-Brakes, of which the following is a specification.

This invention has reference to improvements in pressure-retaining valves for air-brake systems, and its object is to provide means for retaining any desired air pressure in the brake cylinder of an air-brake system while the engineman recharges the auxiliary reservoir.

The invention consists essentially of a valve mechanism introduced in a direct connection between the auxiliary reservoir and the brake cylinder so as to permit the passage of air under pressure from the auxiliary reservoir to the brake cylinder in the usual way for the application of the brakes. This valve mechanism contains a spring-actuated valve which, when the engineman places his brake valve in the lap position and thereby closes all the ports in the triple valve, is closed by the back-pressure from the brake cylinder, and thus retains in the brake cylinder the pressure already attained at this point, and the brakes are kept on until the engineman wishes to release them, which he can do by recharging the auxiliary reservoir to its normal pressure. This is provided for in the valve mechanism forming the subject of the present invention by a connection with the auxiliary reservoir which will respond only when the reservoir has been charged to its normal pressure, say, seventy pounds, at which time a relief valve will be moved to uncover a port leading from the brake cylinder side of the spring-actuated valve before mentioned to the external air.

The invention will be fully understood from the following detailed description taken in connection with the accompanying drawings forming part of this specification, in which,—

Figure 1:
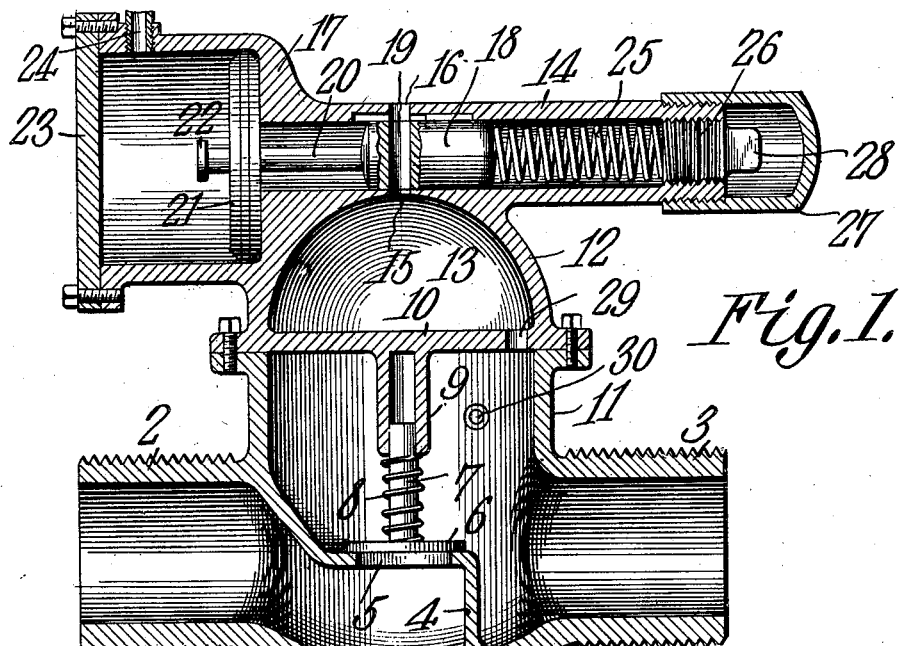
Figure 2:
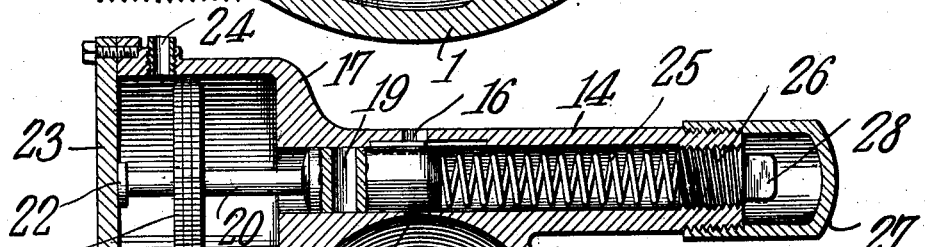

Figure 1 is a central, longitudinal section of the valve mechanism in one phase of its operation; and Fig. 2 is a similar view in another phase of its operation.

Referring to the drawings, there is shown a body or casing 1 similar in structure to that of an ordinary globe valve. This casing is provided with a nipple 2 for the attachment of an air-pipe coming from the auxiliary reservoir and with a nipple 3 for the attachment of an air-pipe leading to the brake cylinder, but neither the auxiliary reservoir nor the brake cylinder is shown in the drawings. The globe portion or casing 1 of the structure is provided with a diaphragm 4 dividing the inlet end 2 from the outlet end 3, and this diaphragm is also provided with a port 5 in which is normally seated a valve 6 having a rubber seat or other means for rendering it air-tight when closed. The stem 7 of the valve 6 is surrounded by a spring 8 and is seated in a guide 9 depending from a top plate 10 fast on a cylindrical side extension 11 of the valve casing 1. The top 10 has formed in one piece with it a semi-globular cap portion 12 inclosing a chamber 13, and this portion 12 carries a cylinder 14 communicating with the chamber 13 through a port 15, and diametrically opposite the latter is provided another port 16 open to the external air. This cylinder 14 is provided at one end with an enlarged extension 17.

Within the cylinder 14 is a piston 18 having diametrically through it a passageway 19 arranged to be brought into coincidence with the ports 15 and 16 during a certain phase of the operation of the valve mechanism. The piston 18 is carried on one end of a piston-rod 20, the other end of which carries a piston 21 of considerably larger diameter than the piston 18 and moving in the interior of the enlarged portion 17 heretofore referred to. The piston-rod 20 extends beyond the piston 21 and is there formed into a head 22. The outer end of the enlarged portion 17 of the cylinder is provided with a cap plate 23 against which the head 22 of the piston-rod may engage to limit its movement in that direction. A pipe 24 leads from this cylinder to the auxiliary reservoir, which latter is not shown. The piston 18 is engaged by a spring 25 confined against the same adjustably by means of a screw plug 26 threaded into the corresponding end of the cylinder 14, and a cap 27 screwed to the exterior of the same end of the cylinder serves to protect this plug from injury or unauthorized manipulation. The plug 26 is provided with a square or polygonal head 28 for the application of an adjusting wrench. Now, let it be supposed that the engineman makes a reduction of pressure in the train pipe, say, twenty pounds, which is the full service application. Air under pressure now passes from the auxiliary reservoir through the port 5 raising the valve 6 against the action of the spring 8. If, now, the engineman wishes to retain this amount of pressure in the brake cylinder, he places his brake valve in the lap position, thus closing all the ports in the triple valve. The spring 8 will now act and the valve 6 will be forced downward, closing the port 5. In the meantime the pistons 18 and 21 have been moved toward the left as viewed in the figures by the action of the spring 25, which has been adjusted to act at seventy pounds pressure in the auxiliary reservoir, which is the normal pressure therein. This has closed the ports 15 and 16, and, therefore, the air in the brake cylinder has no escape and this pressure is consequently maintained. Now, suppose the engineman wished to release the brakes. He recharges the auxiliary reservoir up to its normal pressure which, acting against the piston 21, will compress the spring 25 and permit the piston 18 to move until the passage 19 therein is coincident with the ports 15 and 16. The compressed air from the brake cylinder now finds its way through a port 29 in the top of the plate 10 into the chamber 13 and thence through the port 15, passageway 19 and port 16 to the external air and the pressure in the brake cylinder is reduced to atmospheric pressure. Suppose, however, that it be desired to release the brakes by hand. For this purpose an auxiliary port 30 is provided on the brake cylinder side of the valve casing 1, which port may be controlled by an ordinary release cock or otherwise to allow the escape of the confined air in the brake cylinder whenever desired, independent of the auxiliary reservoir.

I claim:—

1. A pressure-retaining valve for air-brakes comprising a suitable casing, a check valve housed therein, connecting means on each side of said valve for connecting the casing respectively to the air reservoir and brake cylinder of an air-brake system, a cylinder in said housing, ports leading from the interior of the housing through said cylinder to the external atmosphere, a valve in said cylinder having a passageway arranged to be moved coincident with said ports to open the interior of the housing to the external atmosphere, a spring within said cylinder acting on said valve, and a piston connected to said valve and moving in said cylinder and arranged to be acted on by the air pressure in the auxiliary reservoir.

2. A pressure-retaining valve for air-brake systems comprising a spring-actuated check valve introduced between the auxiliary reservoir and the brake cylinder, another valve introduced between the brake cylinder and the external atmosphere, and actuating means for the last-named valve in constant connection with the auxiliary reservoir and acting to close communication with the external air when the pressure in the auxiliary reservoir falls below normal and to open the same when the pressure in the auxiliary reservoir is at normal.

In testimony that I claim the foregoing as my own, I have hereto affixed my signature in the presence of two witnesses.

CHARLES L. UPDEGRAFF.

Witnesses:
HOWARD W. NEIDIG,
CHARLES HORRICK.